United States Patent [19]

Burke et al.

[11] 3,886,295

[45] May 27, 1975

[54] LOW CALORIE SYNTHETIC SEASONING

[75] Inventors: Noel I. Burke, Danville, Ill.; Albin F. Turbak, Convent Station, N.J.

[73] Assignee: Tee-Pak, Inc., Chicago, Ill.

[22] Filed: Jan. 4, 1974

[21] Appl. No.: 430,966

[52] U.S. Cl. .............. 426/548; 426/656; 426/658; 426/804; 426/65 D
[51] Int. Cl. .......................... A23l 1/22; A23l 1/26
[58] Field of Search ............ 46/213, 221, 222, 217, 46/804

[56] References Cited
UNITED STATES PATENTS

| | | | |
|---|---|---|---|
| 2,302,511 | 11/1942 | Wallach | 426/213 X |
| 2,876,107 | 3/1959 | Jucaitis et al. | 426/213 X |
| 3,097,946 | 7/1963 | Menzi | 426/213 X |
| 3,168,547 | 2/1965 | Turbak | 195/62 X |
| 3,294,544 | 12/1966 | Stanko | 426/213 X |

*Primary Examiner*—Raymond N. Jones
*Attorney, Agent, or Firm*—Russell L. Brewer; Neal J. Mosely

[57] ABSTRACT

An edible spice composition having low caloric content comprises an admixture of a bulking agent consisting of an edible sulfate salt of cellulose having a degree of substitution of at least 1.5 and a food flavorant present in a proportion of not substantially more than about 50 percent by weight. A preferred spice composition is a sugar substitute and comprises an artificial sweetener such as saccharin, monellin, katemfe, glycyrrhizin, stevioside, naringin dihdrochalcone, or neohesperidin dihydrochalcone.

9 Claims, 1 Drawing Figure

3,886,295

LOW CALORIE SYNTHETIC SEASONING

FIELD OF THE INVENTION

This invention relates to an artificial spice and more particularly to a synthetic sugar substitute having low caloric value.

DESCRIPTION OF THE PRIOR ART

For reasons of health, there has been great emphasis on creating special diets and foods which have low caloric content. Of course, in these diets "sweets" or foods containing substantial sugar or sucrose content have been eliminated because of their high caloric content. These sweets include pastries, pies, candy, icings, soft beverages such as soda pop, whipped toppings, puddings, ice cream, and a multitude of other foods. It so happens that these sweets and soft beverages are one of the favorites in the diets of those who often struggle to maintain or reduce their present weight. Therefore, a need in the food industry arose to find an artificial flavorant or artificial sugar which could be substituted for sucrose in making such sweets but yet would reduce the caloric value of these goods.

An early synthetic sugar substitute included an edible metal salt of cyclohexylsulfamic acid known as sodium or calcium cyclamate. Recently, the use of "cyclamates" were banned in the United States by the F.D.A. in food products because it appeared that it may have certain deleterious effects on humans. Another early development was saccharin which was useful as an artificial sweetener. However, it often was undesirable for making pastries as it did not give body or strength to the pastry during baking. In beverages, saccharin had an after taste which some regarded as being undesirable and it did not hold carbonation as well as sugar-containing beverages.

Another type of synthetic sugar recently developed was an admixture of a starch hydrolyzate and an artificial sweetener such as saccharin. The starch hydrolyzate was used as a bulking agent and as a support for the artificial sweetener. The main disadvantage of this sugar substitute was that the bulking agent was high in caloric content. In order to make a low caloric product the sugar substitute had to be made into a highly porous product as opposed to a dense product.

SUMMARY OF THE INVENTION

An edible synthetic spice having a low caloric content comprises an admixture of a bulking agent consisting of an edible metal sulfate salt of cellulose having a degree of substitution of at least 1.5 and a food flavorant present in a proportion of not substantially more than about 50 percent by weight. In a preferred embodiment of the invention, the flavorant is an artificial sweetener.

The primary advantage of the spice composition of this invention is that it has a low caloric content and because of its physical properties it can be readily substituted for sucrose. Because of this similarity to sucrose, it can be used to produce pastry products having a lower caloric content than pastries made with sucrose, to produce beverages such as soft drinks, and to produce soft drink syrup concentrates.

DRAWINGS

FIG. 1 is a plot of the viscosity vs. weight to volume ratio of the trisodium salt of cellulose trisulfate in water.

DESCRIPTION OF THE PREFERRED EMBODIMENT

Figure 1:
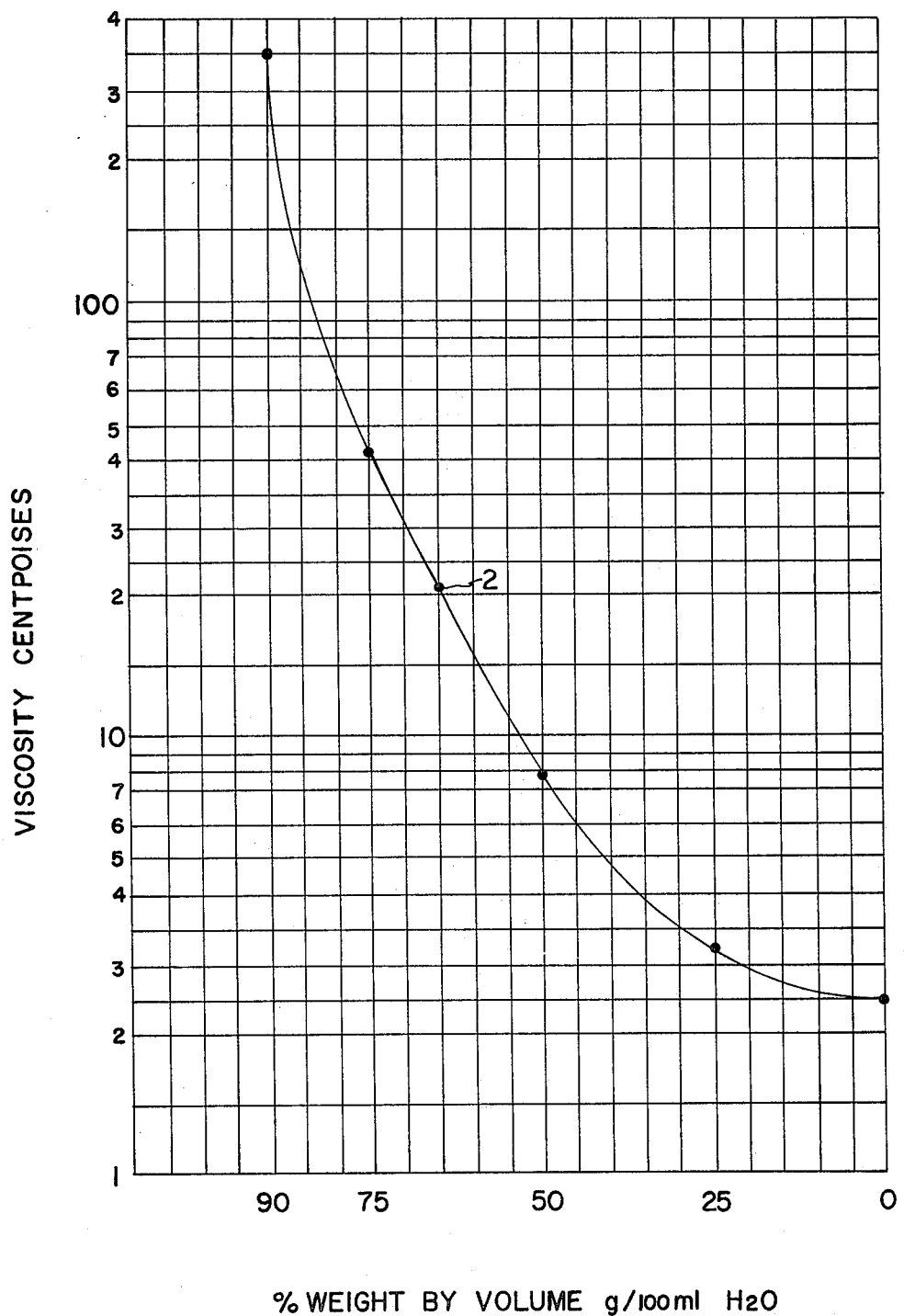

The primary component of the synthetic spice is a bulking agent. It is an edible metal sulfate e.g. alkali metals such as sodium and potassium and calcium salts of cellulose. The degree of substitution (D.S.) of the sulfate salts of cellulose should be at least 1.5 and preferably from 2.5 – 3 with the degree of polymerization (D.P.) being from about 10 – 1,000. When the degree of substitution is substantially below 1.5, e.g., 1.0 or less, the bulking agent often loses its physical characteristics which make it so similar to granular sucrose and therefore renders it undesirable. For example, the water solubility of a cellulose sulfate salt with a low degree of substitution usually is substantially less when the cellulose sulfate salt has a degree of substitution of 1.0 and has a high D.P., e.g. above about 150. Another is that the viscosity of cellulose sulfate-salt water solution usually is much higher when the cellulose sulfate has a DS of 1.5 and a high DP. A low viscosity i.e., less than 200 centipoises at 40 percent solids content and high water solubility is desired for many bakery applications.

The degree of polymerization (DP) of the cellulose has a bearing on the physical properties of the resultant product. Typically, the cellulose sulfate salt can be produced from a cellulose having a DP of from about 10 – 1,000. Ordinarily, the DP of the cellulose is between about 50 – 550 and is preferred. However, as the DP of the cellulose is increased then the corresponding degree of substitution should be increased in order to obtain optimum features. For example, when the DP of cellulose is about 20 – 30 a DS of about 1.5 is suitable but if the DP of the cellulose is over 50 then the DS should be increased in order to achieve a desired viscosity in water and desired water solubility. As a guide a DS of from about 1.5 – 2 is satisfactory for making a cellulose sulfate bulking agent when the cellulose has a DP of from 10 – 50 but a DS of at least 2 is preferred as the DP ranges from 50 – 550.

There are several processes available for making the edible metal sulfate salts of cellulose having a degree of substitution of at least 1.5 and even up to 2. One process which is quite acceptable involves the reacting of cellulose with a sulfur trioxide-trialkyl phosphate complex. This process is shown in U.S. Pat. No. 3,168,547.

Another process for making edible metal cellulose sulfate salts having a degree of substitution of greater than 1.5 and generally having a degree of substitution of 3 involves the formation of a sulfoalkylated ester of cellulose with a sulfur trioxide-organo phosphate complex and then hydrolyzing the ester and reacting the thus formed cellulose sulfate with metal hydroxide. This process is shown in copending application filed Oct. 4, 1973 having U.S. Ser. no. 403,346. The procedures set forth in the patent and copending application for preparing the edible metal sulfate salts of cellulose are incorporated by reference.

It is also known that cellulose sulfate salts can be formed by reacting cellulose with a complex of sulfur trioxide and an amide carrier, e.g., dimethyl formamide. This procedure is not preferred as it is difficult to obtain a high DS (degree of substitution) product.

Charring of the cellulose often occurs when trying to obtain a cellulose sulfate product having a DS of 3.

In making the synthetic low calorie spice, a flavorant is combined with the edible metal cellulose sulfate salt. The flavorants that can be combined with the edible metal sulfate salts of cellulose can be both natural or artificial and in either liquid or solid form. However, liquid flavorants often are more easily applied to the granular edible metal cellulose sulfate salts as the flavorant can be sprayed thereon or the bulking agent dipped into the flavorant. Solids generally are dusted on the bulking agent or blended therewith by mixing in a blender, e.g., ribbon blender to enhance adherence of the flavorant to the bulking agent.

Artificial and natural flavorants which can be incorporated into the bulking agent for producing a desired synthetic flavorant product include cinnamon, clove, oleoresins, B-carutene, artificial sweeteners such as edible metal, saccharin and cyclamate salts, flavonoid glucosides, sage, pimento, coreander, parsley, carroway, nutmeg, cardamon, celery, ginger, vanilla, maple, paprika, methol, lemon, and fruit flavors, e.g., blueberry, strawberry, banana, grape, and blackberry. Also, the oils, essences, and extracts of the above can be applied to the bulking agent.

In preferred spice compositions, the flavorant is an artificial sweetener. The sweetener is incorporated into the bulking agent in varying proportions depending on the sweetness of the sweetener. Edible metal salts of cyclohexylsulfamic acid or of saccharin, e.g., sodium or calcium are representative of sweeteners used today. However, other sweeteners such as monellin, katemfe, stevioside, naringin dihydrochalcone, neohesperidin dihydrochalcone and glycyrrhizin are finding prominence. Katemfe is a tropical fruit and has been found to contain two proteins having a molecular weight of about 20,000 and a sweetness intensity on a ratio basis of about $10^5$ as sweet as sucrose. Monellin is a protein and has a sweetness intensity similar to katemfe. Glycyrrhizin is a component of licorice having a sweetness intensity about 50 times as sweet as sucrose on a weight basis. The dihydrochalcones are obtained from citrus skin flavors and have a sweetness intensity many thousand times as sweet as sucrose.

Combination spices also can be made by combining more than one of the flavorants as desired with the bulking agent. For example, cinnamon and a sweetening agent can be combined to form a product particularly adapted for making cinnamon toast. In making flavorants for ice cream, e.g., mint, lemon, chocolate, etc. flavorants can be combined with the bulking agent.

The proportion of flavorant to be used in making the synthetic spice varies according to the type of flavorant and the degree of flavorant desired. Generally, this proportion is not substantially above about 50 percent by weight and in most cases substantially less than 10 percent by weight. Many of the flavoring oils, essences, or oleoresins are highly concentrated and are applied in proportions of 2 percent or less by weight. For example, saccharin, usually is highly concentrated and a level of about 50 percent of weight would produce a composition having a somewhat bitter taste. Proportions of saccharin for making a synthetic sugar should in most instances not exceed 10 percent by weight and preferably should not exceed about 1 percent. The more potent sweeteners, katemfe, monellin, etc., generally are employed in a proportion not exceeding about 0.05 percent by weight. With most of the flavorants, including the artificial sweeteners, the level of addition based on the weight of the composition is from about 0.0001 – 2 percent by weight.

Edible colorants can also be added to the synthetic flavorant or synthetic sugar as desired in order to produce a product having desired aesthetic characteristics. Conventional food dyes can be used for this purpose and such edible food dyes are well known.

Conventional additives such as stabilizers, preservatives, and emulsifiers can be added to the artificial spice as desired. Stabilizers and emulsifiers often are used in preparing aqueous emulsions of flavorant and the bulking agent for homogeneous dispersion of the flavorant over the bulking agent. Such stabilizers and emulsifiers include mono and diglycerides, polyoxyethylene derivatives of mono and diglycerides, and other fatty acid esters of polyhydric alcohols, e.g., polyoxyethylene sorbitan monostearate.

The following examples are provided to illustrate preferred embodiments of this invention and are not intended to restrict the scope thereof. All percentages are expressed as weight percentages.

EXAMPLE 1

PREPARATION OF THE TRISODIUM SALT OF CELLULOSE TRISULFATE

A 164 g 1 mole) portion of cellulose having a DP (degree of polymerization) of 400 is added to a vessel equipped with an agitator. Then, about 300 g of dichloroethane is added as a carrier for the cellulose and to provide a heat sink during the reaction. The contents are agitated and then a 900 g portion of a sulfur trioxide-triethyl phosphate complex having 1 mole $SO_3$ per mole of triethyl phosphate (about 10 percent excess required for a DS (degree of substitution) of 3) is added over a period of about 15 minutes. The temperature of the reaction contents is maintained at about 25°C. during the addition of the sulfur trioxide complex. After about 1 hour at this temperature, the reaction is terminated. Then, about 1,000 cc of methanol is added to the reaction mixture. When a 150 g portion of sodium hydroxide is added a precipitate forms. The precipitate is filtered from the liquid and dried in a vacuum oven.

The resulting dried product is the trisodium salt of cellulose trisulfate. It is free flowing and granular in form, light brown in color, a slightly salty taste, a bulk density of about 0.43 g/cc and is soluble in a proportion of about 40 percent by weight in water.

The viscosity of solutions of the trisodium salt of cellulose trisulfate in water versus the weight to volume ratio in g/100 ml $H_2O$ are measured and plotted on a graph shown in FIG. 1. The viscosity is measured in centipoises and plotted on the ordinate. The weight to volume ratio that is the grams of trisodium salt of cellulose trisulfate per 100 ml is plotted as the abscissa.

As noted on the graph at Point 2, the viscosity of a solution of the trisodium salt of cellulose trisulfate in water having 40 percent solids content is substantially less (i.e., about 20) than the reported minimum of 200 centipoises for such concentration. All of the above characteristics indicate that the product can be used in many instances as a substitute for making a product similar to granular sucrose.

EXAMPLE 2

A synthetic sugar substitute is prepared by mixing 42.75 g of the trisodium salt of cellulose trisulfate of Example 1 with 2.25 g of sodium saccharin solution in water having a saccharin concentration of about 10 percent by weight and 45 g of a porous starch hydrolyzate. The product is a very light flake and is moisture sensitive. It has a bulk density of about 0.21 g/cc, a tap density of about 0.28 g/cc, and a sweet-salty taste. The product is highly useful as a substitute for granular sucrose.

EXAMPLE 3

A cinnamon-sweet flavored edible spice is prepared by admixing 10 g of powdered cinnamon with 90 g of the sweetened cellulose trisulfate salt of Example 2 in a blender. The powdered cinnamon adheres to the surface of the sweetened cellulose trisulfate salt. The resulting product has a sweet-cinnamon taste and is useful for making cinnamon-sugar toast.

EXAMPLE 4

A synthetic sugar substitute is prepared in exactly the same manner as in Example 2 except that the porous starch hydrolyzate is left out.

The bulk density is about the same as that of the original trisodium salt of cellulose trisulfate. This product can be used in soft drink beverages to hold in carbonation and can be used as a sugar substitute for making bakery products.

EXAMPLE 5

A synthetic syrup having low caloric content is prepared by blending 4 volume parts of the synthetic sugar of Example 2, 0.2 volume parts of liquid maple flavoring, and 1 volume part water. The resulting syrup is an excellent substitute for natural maple syrup and has the advantage in that it is substantially non-caloric.

EXAMPLE 6

A synthetic sugar is prepared from a dried cellulose trisulfate product produced in accordance with the instructions in Example 1 by spraying a 100 g of a solution containing 0.01 percent katemfe in anhydrous ethanol onto 1,000 g of the cellulose trisulfate. After the solution is sprayed onto the trisulfate the product is dried for removing the ethanol. The resulting product is extremely sweet and acceptable as a substitute for sucrose.

EXAMPLE 7

A product acceptable for use as a sweetening agent and a substitute for sucrose is prepared in accordance with Example 6 except that neohesperidin dihydrochalcone is substituted for katemfe.

We claim:

1. A synthetic seasoning composition having low caloric content which comprises an admixture of a bulking agent consisting of an edible metal salt of cellulose sulfate having a degree of substitution of at least 1.5 and an effective amount of an edible food flavorant present in a proportion of not substantially more than 50 percent by weight.

2. The composition of claim 1 wherein said bulking agent has a degree of substitution of at least 2 and a degree of polymerization from about 50 – 550.

3. The composition of claim 2 wherein said edible metal is an alkali metal or calcium.

4. The composition of claim 3 wherein said flavorant is a sweetener.

5. The composition of claim 4 wherein said sweetener is selected from the group consisting of cyclohexylsulfamic acid and saccharin, katemfe, monellin, stevioside, and dihydrochalcones.

6. The composition of claim 5 wherein said sweetener is an alkali metal salt of saccharin.

7. The composition of claim 6 wherein said alkali metal salt is sodium.

8. The composition of claim 5 wherein said sweetener is katemfe.

9. The composition of claim 5 wherein said sweetener is a dihydrochalcone selected from the group consisting of neohesperidin and naringin.

* * * * *